Aug. 2, 1949.  J. W. MOMBERG ET AL  2,478,160
SYSTEM OF ELECTRICAL BRAKING
Filed Dec. 22, 1945

Witness:
Godfrey Pecina

INVENTORS
James W. Momberg and
BY    Harry B. Fuge
William P. Stewart
ATTORNEY

Aug. 2, 1949.    J. W. MOMBERG ET AL    2,478,160
SYSTEM OF ELECTRICAL BRAKING
Filed Dec. 22, 1945    2 Sheets-Sheet 2

Witness:
Godfrey Pecing

INVENTORS
James W. Momberg and
BY    Harry B. Fuge

William F. Stewart
ATTORNEY

Patented Aug. 2, 1949

2,478,160

UNITED STATES PATENT OFFICE 2,478,160

SYSTEM OF ELECTRICAL BRAKING

James W. Momberg and Harry B. Fuge, Somerville, N. J., assignors to The Singer Manufacturing Company, Elizabeth, N. J., a corporation of New Jersey Application December 22, 1945, Serial No. 636,705

10 Claims. (Cl. 318—210)

This invention relates to improved electrical braking of electric motors and more especially to a novel system of plugging-braking in which an electric tachometric device controls the removal of power to the motor in order to terminate the braking period at an optimum time.

More especially, this invention may be considered an extension and an improvement of the braking system set forth and described in the prior U. S. application of Harry B. Fuge, Serial No. 604,960, filed July 13, 1945.

In motor systems in which jogging or inching control is required, braking may begin at any speed depending upon whatever speed the motor has reached when the jog button is released. By jogging or inching control is meant control in which the motor produces forward driving torque only so long as the push-button is held down. It is evident, therefore, that with jogging or inching, the braking may be initiated at any speed, i. e. under widely different conditions of stored kinetic energy. For this reason, the braking time cannot be predicted and, thus, systems which employ definite time delay devices to control the disconnection of the motor from the line, such for example, as the system of the aforesaid U. S. application Serial No. 604,960, cannot be successfully employed for jogging service.

Braking systems have been developed heretofore for jogging service, said systems having motor speed-responsive elements to control the removal of power from the motor. These systems have not, in general, been very successful for several reasons. Among these may be mentioned the following: (1) too expensive, (2) too bulky, (3) require too much torque to operate, and (4) too critical of adjustment.

It is an object of this invention, therefore, to provide a motor braking control system which shall be inexpensive, compact and adapted for inching control.

A further object of this invention is to provide a motor braking control system which employs a speed sensitive device requiring a minimum torque to operate and having no critical adjustments.

These objects are attained in the present invention by providing a small but rugged inductor alternator connected to the motor shaft and feeding its output voltage to a special sensitive relay and electronic tube control system.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
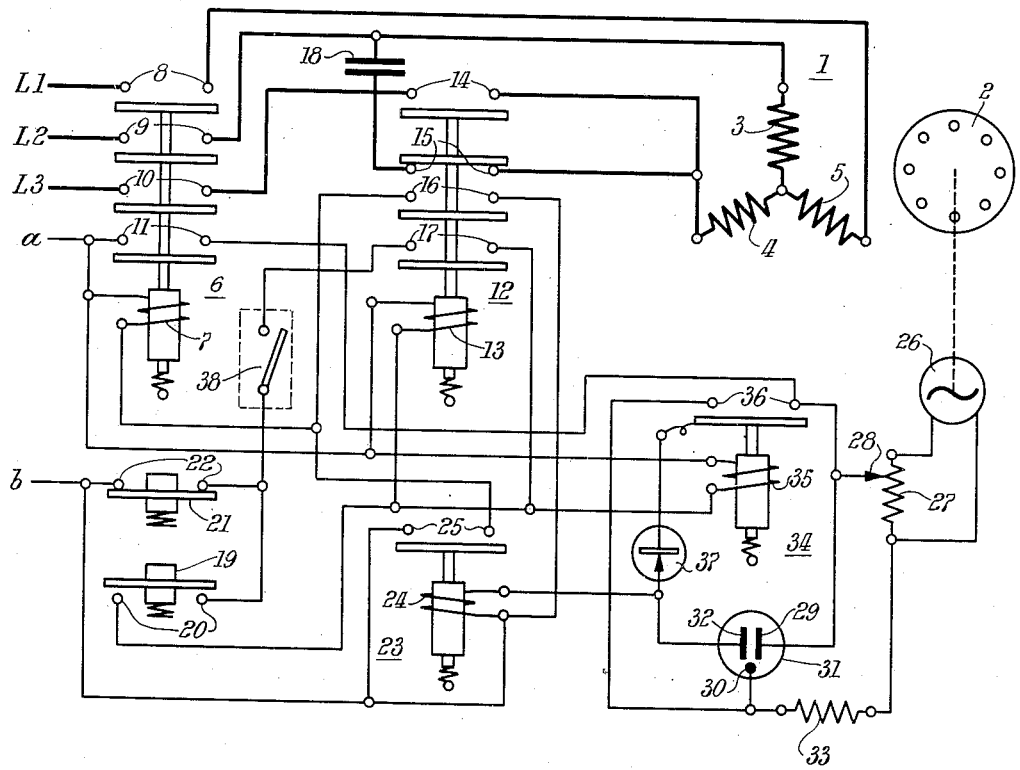
Fig. 1 is a diagrammatic illustration of a circuit for electrically braking a polyphase induction motor and embodying the invention.

Referring to Fig. 1, the invention is shown as applied to a polyphase motor 1 having a rotor 2 and a stator provided with windings 3, 4 and 5. A normally-open starting contactor 6, having operating coil 7, and contacts 8, 9, 10 and 11, is employed to connect the motor windings 3, 4 and 5 to supply lines L1, L2 and L3 of a three-phase source of alternating current to establish the normal polyphase running condition for the motor 1.

A stopping contactor 12, having operating coil 13, normally-open contacts 14, 16 and 17, and normally-closed contacts 15, is employed to reconnect the motor windings 3, 4 and 5 with one phase L1—L2 of the supply and with a braking capacitor 18. These contactors are of conventional type and may be any polyphase and single-phase contactors respectively which have the required number and kind of contacts. A starting push-button 19, with contacts 20, and a stopping push-button 21, with contacts 22, are used, as will be presently described, to actuate the contactors 6 and 12.

A normally-open rotation relay 23, having an operating coil 24 and contacts 25, is employed to open the circuit to operating coil 7 of the starting contactor responsive to motor speed, as will be explained presently.

A small alternating-current generator 26, preferably of the induction variable-reluctance type, has its rotor mechanically connected with the rotor 2 of the motor 1. The voltage generated by the alternator 26 is proportional to the rotor speed and is applied across a high-impedance potentiometer 27. An adjustable proportion of this voltage may be taken from the potentiometer 27 by means of slider 28 and applied between cathode 29 and starter or control electrode 30 of a cold-cathode gas triode control tube 31 having an anode 32. This tube may be a standard commercial R. C. A. OA4-G tube. Resistor 33 is connected in series with the circuit comprising potentiometer 27, cathode 29, and starter electrode 30 in order to limit the current flow to the tube. An auxiliary source of single-phase alternating current is denoted by the lines $a$ and $b$.

A circuit may be traced from the anode 32 to the cathode 29 as follows: from anode 32 through operating coil 24, to one line $b$ of the supply, thence from the other line $a$ of said supply, through contacts 11 to cathode 29. When the control tube 31 conducts, the circuit traced above is closed (if starting contactor 6 is closed) and the voltage between the lines $a$ and $b$ rectified by the tube 31, is impressed upon coil 24 thus causing rotation relay 23 to pick up and close contacts 25. Whether or not tube 31 will conduct depends upon the voltage applied between the cathode 29 and the starter electrode 30 which voltage is proportional to the speed of motor 1. If this voltage is above a certain minimum value, which value depends upon the supply voltage applied between anode 32 and cathode 29, the tube conducts. Below this critical voltage, the tube will not conduct. It is evident, therefore, that the rotation relay 23 may be made to pick up and drop out at predetermined motor speeds.

The control current required to be supplied from the alternator 26 to the tube 31 is negligible, being of the order of 100 microamperes. This means low torque requirements and good voltage regulation for the alternator. However, this small amount of energy is enabled accurately to control the opening and closing of contacts 25 of the rotation relay by reason of the high sensitivity of the control tube.

A normally-open transfer relay 34 having operating coil 35 and contacts 36 is employed to transfer the feed circuit to the operating coil 24 of the rotation relay 23 from the supply lines $a, b$ through fixed rectifier 37 to that from the supply lines through the control tube 31. The operating coil 35 is connected in shunt with operating coil 13 of the braking or stopping contactor 12.

A single-pole, single-throw switch 38 is connected in series with the shunt circuit around push-button contacts 20 provided by the auxiliary contacts 17 of the braking contactor 12. With this switch 38 in closed position, the starting push-button 19 is operative to start the motor, which will continue to run even after the push-button is released. In the open position of said switch 38, however, the motor will start and run only so long as the starting push-button remains depressed. This latter switch position is called the jogging or inching position.

The detailed operation of this braking circuit will now be explained with reference to Fig. 1. When it is desired to start motor 1, push-button 19 is depressed and momentarily a circuit is completed from line $b$ through contacts 22, contacts 20, operating coil 13 and to the line $a$. This causes braking contactor 12 to pick up, thus closing contacts 14, 16 and 17 and opening contacts 15. If switch 38 is closed, closure of contacts 17 provides a shunt path around the push-button contacts 20, thus maintaining the circuit just described even though the push-button itself is closed only momentarily. Closure of contacts 16 provides application of voltage from $a$ and $b$ to the operating coil 7. Starting contactor 6 picks up and closes contacts 8, 9, 10 and 11 to connect the motor windings with the supply lines to start the motor. The motor is thus brought up to speed and runs normally with this connection.

It will be observed that the transfer relay 34 will pick up due to the shunt relation of the operating coils 35 and 13. Closure of contacts 36 of the transfer relay 34 causes operating coil 24 of the rotation relay 23 to be energized by way of the following circuit. From line $b$ through coil 24, rectifier 37, contacts 36, through contacts 11 to line $a$. Closure of contacts 25 of the rotation relay places a shunt path in parallel with the auxiliary contacts 16 of the braking contactor 12. Thus, if the rotation relay contacts 25 remain closed, the starting contactor will be held in regardless of the position of the braking contactor. This is important as will be seen presently.

When it is desired to stop the motor, the stopping push-button 21 is depressed. This opens the control circuit to the braking contactor coil 13 and releases the contactor thus opening contacts 14, 16 and 17 and closing contacts 15. This switching removes the connection between L3 and winding 4 and connects the capacitor 18 across the terminals of windings 3 and 4. The motor 1, being thus connected as a single-phase capacitor motor of rotation reversed from its three-phase direction, is quickly braked to a low speed. Opening of push-button contacts 22 will also open the circuit to coil 35 and drop out the transfer relay 34 and open contacts 36. When this occurs, the circuit supplying the coil 24 of rotation relay is as follows: line $a$, through contacts 11, cathode 29, anode 32, coil 24, thence to line $b$. Thus, if the voltage supplied by the alternator 26 is above a certain minimum value as determined by the position of slider 28 and the characteristics of the tube 31, said tube 31 will conduct and will supply current to the coil 24 to hold in relay 23 and maintain contacts 25 in their closed position. It is to be noted that, with contacts 16 of the braking contactor open, the only contacts providing a circuit for holding in the starting contactor 6 are contacts 25 of rotation relay 23. Thus, as motor 1 slows down due to the single-phase plugging, the voltage delivered by alternator 26 (and applied to the control anode 30) drops and ultimately reaches a value (at low speed) such that it can no longer maintain conduction through tube 31. Current is cut off from coil 24 and contacts 25 are opened to deenergize coil 7 and open the contacts 8, 9, 10 and 11 of starting contactor 6, thus disconnecting the motor windings 3, 4 and 5 from the lines L1, L2 and L3. The motor is stopped and the system returned to its initial condition. It will be understood that slider 28 may be adjusted so that contactor 6 will open when the motor just reaches standstill condition, taking into account the load inertia and the time lags in the tube 31, and coils 24 and 7.

The operation cycle just described is effected with the switch 38 in closed position and corresponds to normal starting, running and stopping.

There will now be described, with reference to the system of Fig. 1, a jogging-braking operation for which switch 38 will be placed in its open position. Thus, when push-button 19 is pressed to close contacts 20, both coils 13 and 35 will be energized, thereby picking up the transfer relay 34 and the braking contactor 12. However, by opening switch 38, contacts 17 are now rendered inoperative for shunting the contacts 20, and there is no means for holding in the contactor 12 and the transfer relay 34. As a result, the motor will be energized to start and run only so long as push-button 19 remains depressed. The actual circuit operation is otherwise the same as described above with respect to normal starting and running. With switch 38 open, when push-button 19 is released and contacts 20 open, the circuit cannot distinguish this operation from an opening of contacts 22 (as when the stopping push-button 21 is depressed). Thus when the operator releases push-button 19, the system operates to plug and brake the motor to standstill precisely as described hereinbefore with respect to the operation resulting from depressing the stopping push-button 21. In this way, by opening switch 38, the starting push-button becomes useful for jogging or inching service and the operator may accurately control small displacements of the motor rotor by means of a single push-button.

The life of tube 31 depends upon the time of application of voltage to the control electrode 30 and the cathode 29. The circuit of Fig. 1 provides for a maximum tube life by applying this control voltage to the tube only when it is needed to govern the braking period. It will be seen that closure of contacts 36 of transfer relay 34, when the motor is starting and running, as explained, provides a short-circuit from cathode 29 to control electrode 30. Thus, during the long periods of motor running no control voltage can appear on the tube electrodes and its actual life is thereby materially lengthened. Further, since a cold cathode type of tube is used, there will not be the trouble from recalibration due to filament voltage variation encountered in a tube of the hot cathode type.

Figure 2:
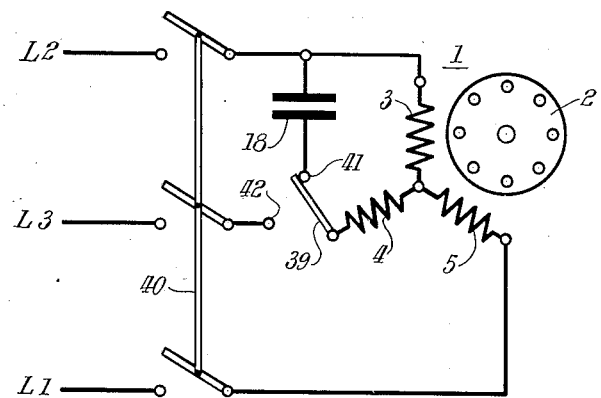
Fig. 2 is a simplified schematic illustration showing only the primary connections of the circuit of Fig. 1.

A preferred arrangement of the system, with respect to its primary components, is shown in Fig. 2 wherein it is seen that braking capacitor 18 is normally connected by means of the single-pole, double-throw switch 39 across the terminals of windings 3 and 4 of the motor 1. A three-pole, single-throw switch 40 simulates the primary connections effected by the starting contactor 6 of Fig. 1. The switch 39 simulates the primary connections of the braking contactor 12 of Fig. 1. When it is desired to start and run the motor 1, switch 39 first closes so that its blade makes contact with terminal 42. Next, switch 40 closes and connects the motor windings 3, 4 and 5 with the supply lines L1, L2 and L3 and the motor comes up to speed and runs normally. When it is desired to stop the motor, for any reason, switch 39 is operated to put its blade in contact with terminal 41. The motor is now connected as a single-phase capacitor motor of reversed rotation and will be braked by plugging action as described in the prior U. S. application Serial No. 604,960 referred to hereinbefore. With this system, it will be observed that the braking capacitor 18 is connected in circuit during only the actual braking period. For most applications, this will be for a time duration of but a very small fraction of the total elapsed time. Thus, a capacitor rated for intermittent short-time duty is satisfactory for most applications and is reflected in a smaller and less-expensive capacitor than would be the case for continuous duty.

Figure 4:
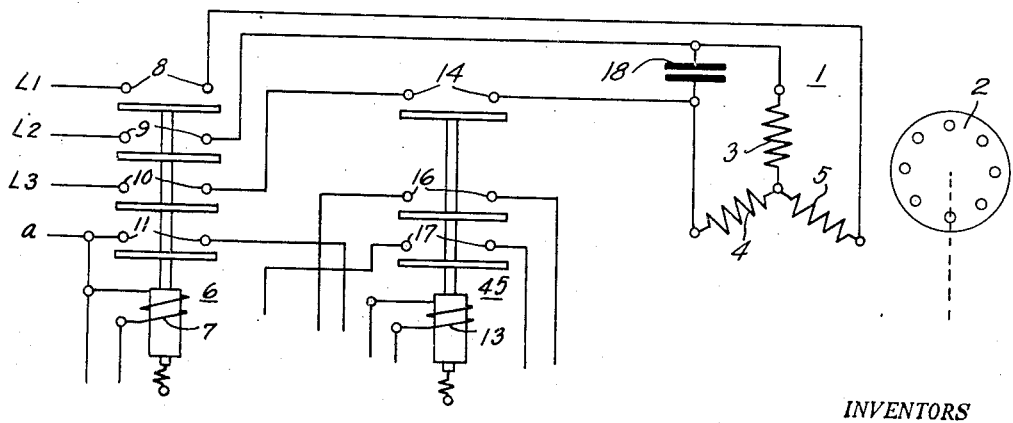
Fig. 4 is a partial circuit diagram showing that part of the diagram of Fig. 1 which is modified to provide the circuit shown in simplified form in Fig. 3.
Figure 3:
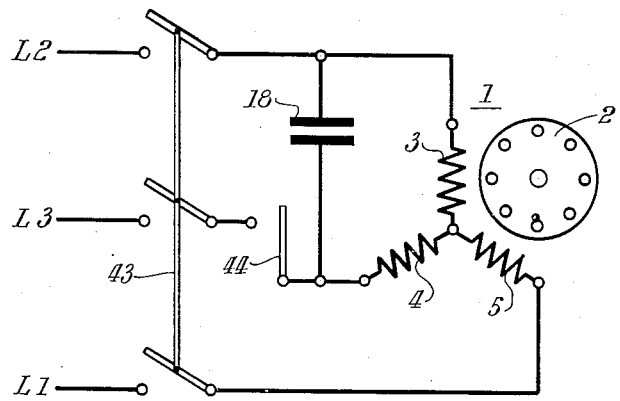
Fig. 3 is a simplified schematic illustration showing a modification of the primary circuit of Fig. 1.

A modified arrangement of the system, with respect to its primary components, is illustrated in Fig. 3 wherein it is seen that braking capacitor 18 is permanently connected across two of the terminals of the motor 1. A three-pole, single-throw switch 43 is shown and simulates the primary connections of the starting contactor 6 of Fig. 1. A single-pole single-throw switch 44 simulates the primary connections of the braking contactor 12 of Fig. 1. With this arrangement, it is clear that the normal polyphase running condition of the motor is produced by first closing switch 44 and then switch 43. During this running condition, the braking capacitor 18 serves as a power factor corrector for one phase of the supply. It will be seen that, to adapt the circuit of Fig. 1 to the modification of Fig. 3, it is merely necessary to reconnect the capacitor 18 across the terminals of windings 3 and 4 of the motor 1 and to eliminate the contacts 15 from the contactor 12. This has been done in Fig. 4 wherein the stopping contactor 45 is the only element differing from those of Fig. 1. The circuit of Fig. 4 operates precisely the same as that of Fig. 1 with the single exception that the capacitor 18 is now utilized for power factor correction when not braking. It is clear that, in systems employing many motors, the braking capacitors may be distributed among the phases so as to produce a balanced system. In this way, the capacitor, which ordinarily is used for small intermittent periods of time when braking is required, now becomes effective throughout the running time of the motor, resulting in savings in idle capital investment.

To plug the motor in Fig. 3, switch 44 is opened which reconnects the motor as a single-phase capacitor motor of reverse rotation across lines L1 and L2.

In general, at the end of the braking period, as determined by the voltage generated by pilot alternator 26 operative upon the control tube 31 and the rotation relay 23, starting-contactor 6 opens and removes power from the motor.

It will be seen from Figs. 2 and 3 that, in the event of loss of supply voltage when the motor is running, both switches will be in the positions shown. The capacitor remains connected across the motor terminals and provides a path for the flow of currents which produce dynamic braking of the motor in accordance with well-known practice. In this way, the motor 1 will be automatically and dynamically braked and brought to rest more quickly than if permitted to coast.

It will be perceived that the system described above provides a fast electrical braking control which, due to the sensitive speed-responsive feature, is accurate in removing plugging power from the motor at standstill and substantially independently of the motor speed at which the braking is initiated.

While this invention has been described herein in connection with a manually-operated stopping push-button, its application is not limited thereby, but includes within its scope control systems in which the starting and stopping action is automatically initiated by a change in the function desired to be controlled. By preventing over-travel and coasting, this use of the system of the invention provides a closer control action even though the rotating parts may have considerable inertia.

It will be obvious to those skilled in the art that the invention may, without departure from its essential attributes, be embodied in various specific forms other than those shown and described, which latter are to be considered in all respects as illustrative of the invention and not restrictive, reference being had to the appended claims rather than to the foregoing description to indicate the scope of the invention.

Having thus set forth the nature of the invention, what we claim herein is:

1. In a system for controlling the braking of an electric motor by plugging, in combination, plugging means, control means to limit the duration of action of the plugging means, a fixed voltage source, a source of variable voltage responsive to the speed of said motor, and transfer means for selectively connecting said control means to either the source of constant voltage or to the source of variable voltage for terminating said plugging action at a predetermined motor speed.

2. In a system for controlling the electrical braking of a polyphase induction motor by single-phase plugging, in combination, plugging means including a capacitor, control means to limit the duration of action of the plugging means, a fixed voltage source, a source of variable voltage responsive to the speed of said motor, manual means to adjust the voltage-speed relation and transfer means for selectively connecting said control means to either the source of constant voltage or to the source of adjusted variable voltage for terminating said plugging action at a predetermined motor speed.

3. In a system for controlling the electrical braking of a polyphase induction motor by single-phase plugging, in combination, plugging means including a capacitor, control means to limit the duration of action of the plugging means, a fixed voltage source, a source of variable voltage responsive to the speed of said motor, transfer means operative from said plugging means for selectively connecting said control means to either the source of constant voltage or to the source of variable voltage and manual means for modifying the variable voltage so that the plugging action will be terminated substantially at standstill after said transfer means operates to connect the control means to said source of modified variable voltage.

4. In a system for controlling the braking of an electric motor by plugging, in combination, a motor, a source of electrical energy, means for connecting said motor to said source for running, means for reconnecting said motor to said source for plugging, control means for limiting the time of duration of said plugging connection, a source of constant voltage, a source of variable voltage responsive to the speed of said motor, and transfer means for transferring the connection of said control means from said constant to said variable voltage source coincidentally with the change from said running to said plugging connection for terminating said plugging action at a predetermined motor speed.

5. In a system for controlling the electrical braking of a motor by plugging, in combination, a polyphase induction motor, a source of electrical energy, a capacitor, means for connecting said motor to said source for running, means for connecting said motor to part of said source and to said capacitor for plugging, control means for limiting the time of duration of said plugging connection, a source of constant voltage, a source of variable voltage responsive to the speed of said motor, means for modifying said variable voltage, and transfer means for transferring the connection of said control means from said constant to said modified variable voltage coincidentally with the change from running to plugging connection for disconnecting said motor from the source substantially at standstill.

6. In a system for controlling the electrical braking of an electric motor by plugging to standstill, in combination, a polyphase induction motor, a source of polyphase electrical energy, a source of single-phase electrical energy, a capacitor, means for connecting said motor to said polyphase source for running, means for connecting said motor to said single-phase source and to said capacitor for plugging, control means for limiting the time of duration of said plugging connection, a source of constant voltage, a source of variable voltage responsive to the speed of said motor, means for modifying said variable voltage, and transfer means for transferring the connection of said control means from said constant to said modified variable voltage coincidentally with the change from the running to the plugging connection for terminating said plugging action substantially at the standstill condition of said motor.

7. A system for controlling the electrical braking of an electric motor comprising a polyphase induction motor, a source of electrical energy, a capacitor, first switching means for connecting said motor to said source for running, second switching means for connecting said motor to part of said source and to said capacitor for plugging, automatic control means for controlling the operation of said first switching means, a source of constant voltage, a source of variable voltage responsive to the speed of said motor, transfer means responsive to the operation of said second switching means for changing the connection to said automatic control means from said constant voltage source to said variable voltage source for operating said first switching means to disconnect said motor from said source substantially when the motor has been braked to standstill.

8. A system for controlling the electrical braking of an electric motor comprising a polyphase induction motor, a source of electrical energy, a capacitor connected permanently across the motor terminals, first switching means for connecting said motor to said source, second switching means for connecting one terminal of said motor to one terminal of said first switching means, said first and second switching means being in their disconnected positions during the normal deenergized condition of the system.

9. A system for controlling the electrical braking of an electric motor comprising a polyphase induction motor, a source of electrical energy, a capacitor having one end permanently connected to a first terminal of said motor, first switching means for connecting and disconnecting said motor to and from said source, second switching means for selectively connecting a second terminal of said motor to either the other end of said capacitor or to one terminal of said first switching means, said first switching means being in its disconnected position and said second switching means being in a position to connect an end of said capacitor to one terminal of said motor during the normal deenergized condition of the system.

10. In a system for controlling the braking of an electric motor by plugging, in combination, a motor, a source of electrical energy, means for connecting said motor to said source to provide a positive phase rotation for running, means for reconnecting said motor to said source to provide a negative phase rotation for plugging, control means for limiting the time of duration of said plugging connection, a source of constant voltage, a source of variable voltage responsive to the speed of said motor, and transfer means for transferring the connection of said control means from said constant to said variable source coincidentally with the change from said running to said plugging connection for terminating said plugging action at a predetermined speed.

JAMES W. MOMBERG.
HARRY B. FUGE.

REFERENCES CITED

The following references are of record in the file of this patent:

UNITED STATES PATENTS

| Number | Name | Date |
|---|---|---|
| 1,515,232 | Whittingham | Nov. 11, 1924 |
| 1,936,620 | Crout et al. | Nov. 28, 1933 |
| 1,983,656 | Brown et al. | Dec. 11, 1934 |

FOREIGN PATENTS

| Number | Country | Date |
|---|---|---|
| 487,695 | Great Britain | June 24, 1938 |
| 717,653 | France | May 27, 1931 |